US011527745B2

(12) United States Patent
Verbrugge et al.

(10) Patent No.: US 11,527,745 B2
(45) Date of Patent: Dec. 13, 2022

(54) METHODS OF PRE-LITHIATING ELECTRODES

(71) Applicant: GM GLOBAL TECHNOLOGY OPERATIONS LLC, Detroit, MI (US)

(72) Inventors: Mark W. Verbrugge, Troy, MI (US); Xingcheng Xiao, Troy, MI (US); Jiagang Xu, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 187 days.

(21) Appl. No.: 16/559,132

(22) Filed: Sep. 3, 2019

(65) Prior Publication Data

US 2021/0066704 A1 Mar. 4, 2021

(51) Int. Cl.
*H01M 4/131* (2010.01)
*H01M 4/134* (2010.01)
(Continued)

(52) U.S. Cl.
CPC .......... *H01M 4/131* (2013.01); *H01M 4/133* (2013.01); *H01M 4/134* (2013.01); *H01M 4/136* (2013.01);
(Continued)

(58) Field of Classification Search
CPC combination set(s) only.
See application file for complete search history.

(56) References Cited

U.S. PATENT DOCUMENTS 8,440,350 B1 5/2013 Verbrugge et al.
8,859,144 B2 10/2014 Xiao
(Continued)

FOREIGN PATENT DOCUMENTS

CN 112448047 A 3/2021

OTHER PUBLICATIONS

Halalay, Ion C. et al., U.S. Appl. No. 16/160,799, filed Oct. 15, 2018 entitled "Method for Making Silicon-Containing Composite Electrodes for Lithium-Based Batteries," 47 pages.
Xiao, Xingcheng et al., U.S. Appl. No. 16/239,027, filed Jan. 3, 2019 entitled "Method for In Situ Growth of Axial Geometry Carbon Structures in Electrodes," 38 pages.
(Continued)

*Primary Examiner* — Yoshitoshi Takeuchi
(74) *Attorney, Agent, or Firm* — Harness, Dickey & Pierce, P.L.C.

(57) ABSTRACT

The present disclosure provides methods of compensation for capacity loss resulting from cycle-induced lithium consumption in an electrochemical cell including at least one electrode. Such methods may include adding a lithiation additive to the at least one electrode so as to create a lithium source. The lithium source compensates for cycle-induced lithiation loss such that the electrochemical cell having the lithiation additive experiences total capacity losses of less than or equal to about 5% of an initial capacity prior to cycling of lithium. The lithiation additive includes a lithium silicate represented by the formula $Li_uH_r$, where $H_r=Li_{y-u}SiO_z$ and where $0 \leq y \leq 3.75$ and $0 \leq z \leq 2$ and u is a useable portion of y, $0 \leq u \leq y$. The lithium source may include $$\frac{z}{4} Li_4 SiO_4$$

and $Li_m Si$, where $0 \leq m \leq 4.4$.

14 Claims, 4 Drawing Sheets

(51) Int. Cl.
    *H01M 4/136* (2010.01)
    *H01M 4/133* (2010.01)
    *H01M 10/052* (2010.01)
    *H01M 4/36* (2006.01)
    *H01M 4/38* (2006.01)

(52) U.S. Cl.
    CPC ........... *H01M 4/366* (2013.01); *H01M 4/386* (2013.01); *H01M 10/052* (2013.01)

(56) References Cited

U.S. PATENT DOCUMENTS

| | | | |
|---|---|---|---|
| 8,999,584 B2 | 4/2015 | Jiang et al. | |
| 9,005,811 B2 | 4/2015 | Xiao et al. | |
| 9,093,705 B2 | 7/2015 | Xiao et al. | |
| 9,142,830 B2 | 9/2015 | Xiao et al. | |
| 9,302,914 B2 | 4/2016 | Liu et al. | |
| 9,362,551 B2 | 6/2016 | Sachdev et al. | |
| 9,379,374 B2 | 6/2016 | Liu et al. | |
| 9,531,004 B2 | 12/2016 | Xiao et al. | |
| 9,564,639 B2 | 2/2017 | Huang | |
| 9,570,752 B2 | 2/2017 | Huang et al. | |
| 9,577,251 B2 | 2/2017 | Xiao et al. | |
| 9,780,361 B2 | 10/2017 | Xiao et al. | |
| 10,062,898 B2 | 8/2018 | Xiao | |
| 10,164,245 B2 | 12/2018 | Huang | |
| 10,854,882 B2 | 12/2020 | Halalay et al. | |
| 10,868,307 B2 | 12/2020 | Huang | |
| 10,950,846 B2 | 3/2021 | Xiao et al. | |
| 2016/0093884 A1* | 3/2016 | Cui ................ H01M 10/052 252/506 |
| 2018/0205114 A1 | 7/2018 | Pauric et al. | |
| 2020/0020948 A1 | 1/2020 | Huang et al. | |
| 2020/0119339 A1 | 4/2020 | Halalay et al. | |

OTHER PUBLICATIONS

Verbrugge, Mark et al., "Fabrication and Characterzation of Lithium-Silicon Thick-Film Electrodes for High-Energy-Density Batteries," Journal of the Electrochemical Society 164 (2), pp. A156-A167; DOI: 10.1149/2.0521702jes (Published Dec. 17, 2016).

\* cited by examiner

METHODS OF PRE-LITHIATING ELECTRODES

INTRODUCTION

This section provides background information related to the present disclosure which is not necessarily prior art.

The present disclosure relates to pre-lithiated electrodes, electrochemical cells including pre-lithiated electrodes, and methods of making the same.

Advanced energy storage devices and systems are in demand to satisfy energy and/or power requirements for a variety of products, including automotive products such as start-stop systems (e.g., 12V start-stop systems), battery-assisted systems, Hybrid Electric Vehicles ("HEVs"), and Electric Vehicles ("EVs"). Typical lithium ion batteries include at least two electrodes and an electrolyte and/or separator. One of the two electrodes serves as a positive electrode or cathode and the other electrode serves as a negative electrode or anode. A separator and/or electrolyte may be disposed between the negative and positive electrodes. The electrolyte is suitable for conducting lithium ions between the electrodes and, like the two electrodes, may be in solid and/or liquid form and/or a hybrid thereof. In instances of solid-state batteries, which include solid-state electrodes and a solid-state electrolyte, the solid-state electrolyte may physically separate the electrodes so that a distinct separator is not required.

Conventional rechargeable lithium-ion batteries operate by reversibly passing lithium ions back and forth between the negative electrode and the positive electrode. For example, lithium ions may move from the positive electrode to the negative electrode during charging of the battery, and in the opposite direction when discharging the battery. Such lithium-ion batteries can reversibly supply power to an associated load device on demand. More specifically, electrical power can be supplied to a load device by the lithium-ion battery until the lithium content of the negative electrode is effectively depleted. The battery may then be recharged by passing a suitable direct electrical current in the opposite direction between the electrodes.

During discharge, the negative electrode may contain a comparatively high concentration of intercalated lithium, which is oxidized into lithium ions and electrons. Lithium ions may travel from the negative electrode to the positive electrode, for example, through the ionically conductive electrolyte solution contained within the pores of an interposed porous separator. Concurrently, electrons pass through an external circuit from the negative electrode to the positive electrode. Such lithium ions may be assimilated into the material of the positive electrode by an electrochemical reduction reaction. The battery may be recharged or regenerated after a partial or full discharge of its available capacity by an external power source, which reverses the electrochemical reactions that transpired during discharge.

In various instances, however, a portion of the intercalated lithium remains with the negative electrode following the first cycle, for example, due to the formation of a solid electrolyte interphase (SEI) layer on the negative electrode during the first cycle, as well as ongoing lithium loss due to continuous solid electrolyte interphase breakage. Such permanent loss of lithium ions may result in a decreased specific energy and power in the battery resulting from added positive electrode mass that does not participate in the reversible operation of the battery. For example, the lithium-ion battery may experience an irreversible capacity loss of greater than or equal to about 5% to less than or equal to about 30% after the first cycle. Accordingly, it would be desirable to develop improved electrodes and methods of making improved electrodes for an electrochemical cell that can address these challenges.

SUMMARY

This section provides a general summary of the disclosure, and is not a comprehensive disclosure of its full scope or all of its features.

In various aspects, the present disclosure provides a method of compensation for capacity loss resulting from cycle-induced lithium consumption in an electrochemical cell including at least one electrode. The method includes adding a lithiation additive to the at least one electrode to create a lithium source that compensates for cycle-induced lithium loss that occurs when lithium is cycled in the electrochemical cell such that the electrochemical cell experiences a total capacity loss of less than or equal to about 5% of an initial capacity prior to any cycling of lithium. The lithiation additive includes a lithium silicate represented by the formula $Li_uH_r$ where $H_r=Li_{y-u}SiO_z$ and where $0 \leq y \leq 3.75$ and $0 \leq z \leq 2$ and u is a useable portion of y, $0 \leq u \leq y$.

In one aspect, the lithium source may include and $Li_mSi$, where $0 \leq m \leq 4.4$.

In one aspect, the at least one electrode may include greater than or equal to about 1 wt. % to less than or equal to about 50 wt. % of the lithiation additive.

In one aspect, the method may further include combining the lithiation additive with an electroactive material and a current collector in an environment comprising oxygen that is substantially free of water and has a dew point of greater than or equal to about −100° C. to less than or equal to about 0° C.

In one aspect, combining the lithiation additive with an electroactive material may include mixing greater than or equal to about 1 wt. % to less than or equal to about 50 wt. % of the lithiation additive with greater than or equal to about 50 wt. % to less than or equal to about 95 wt. % of electroactive material and disposing the mixture on a first surface of the current collector.

In one aspect, combining the lithiation additive with an electroactive material may include forming a lithiation layer comprising the lithiation additive adjacent to the current collector and forming an electroactive layer on one or more exposed surfaces of the lithiation layer.

In one aspect, the lithiation layer may have a thickness greater than or equal to about 10 nm to less than or equal to about 10 µm; and the electroactive layer may have a thickness greater than or equal to about 500 nm to less than or equal to about 200 µm.

In one aspect, the electroactive material may be selected from the group consisting of: lithium, silicon, silicon oxide, graphite, graphene, carbon nanotubes, lithium titanium oxide (Li4Ti5O12), tin (Sn), vanadium oxide (V2O5), tin oxide (SnO), titanium dioxide (TiO2), titanium niobium oxide (TixNbyOz, where $0 \leq x \leq 2$, $0 \leq y \leq 24$, and $0 \leq z \leq 64$), iron sulfide (FeS), and combinations thereof.

In one aspect, the method may further include cycling lithium in the electrochemical cell.

In various other aspects, the present disclosure provides a method of forming a pre-lithiated electrode for incorporation into an electrochemical cell. The method may include combining a lithiation additive with an electroactive material and a current collector in an environment including oxygen that is substantially free of water and has a dew point of greater than or equal to about −100° C. to less than or equal to about 0° C. The lithiation additive may include a lithium silicate represented by the formula $Li_uH_r$, where $H_r=Li_{y-u}SiO_z$ and where $0 \leq y \leq 3.75$ and $0 \leq z \leq 2$ and u is a useable portion of y, $0 \leq u \leq y$.

In one aspect, combining may include mixing greater than or equal to about 1 wt. % to less than or equal to about 50 wt. % of the lithiation additive with greater than or equal to about 50 wt. % to less than or equal to about 95 wt. % of electroactive material and disposing the mixture on a first surface of the current collector.

In one aspect, combining may include forming a lithiation layer including the lithiation additive adjacent to the current collector and forming an electroactive layer on one or more exposed surfaces of the lithiation layer.

In one aspect, the lithiation layer may have a thickness greater than or equal to about 10 nm to less than or equal to about 20 μm; and the electroactive layer may have a thickness greater than or equal to about 500 nm to less than or equal to about 200 μm.

In one aspect, the electroactive material may be selected from the group consisting of: lithium, silicon, silicon oxide, graphite, graphene, carbon nanotubes, lithium titanium oxide ($Li_4Ti_5O_{12}$), tin (Sn), vanadium oxide ($V_2O_5$), tin oxide (SnO), titanium dioxide ($TiO_2$), titanium niobium oxide ($Ti_xNb_yO_z$, where $0 \leq x \leq 2$, $0 \leq y \leq 24$, and $0 \leq z \leq 64$), iron sulfide (FeS), and combinations thereof.

In one aspect, the lithiation additive may include a lithium source. The lithium source may include $Li_4SiO_4$ and $Li_mSi$, where $0 \leq m \leq 4.4$. The electrode may have a capacity loss of less than or equal to about 5% of an initial capacity prior to cycling of lithium in the electrochemical cell.

In various other aspects, the present disclosure provides a method of forming a pre-lithiated electrode for an electrochemical cell. The method includes forming a lithiation layer including a lithiation additive adjacent a current collector in an environment comprising oxygen and that is substantially free of water and has a dew point of greater than or equal to about −100° C. to less than or equal to about 0° C. The method may further include forming an electroactive layer on one or more exposed surfaces of the lithiation layer. The lithiation additive may include a lithium silicate represented by the formula $Li_uH_r$, where $H_r=Li_{y-u}SiO_z$ and where $0 \leq y \leq 3.75$ and $0 \leq z \leq 2$ and u is a useable portion of y, $0 \leq u \leq y$.

In one aspect, the lithiation layer may have a thickness greater than or equal to about 10 nm to less than or equal to about 20 μm and a lithium source. The lithium source may include and $Li_mSi$ and $0 \leq m \leq 4.4$.

In one aspect, the electroactive layer may have a thickness greater than or equal to about 500 nm to less than or equal to about 200 μm and the electroactive layer may include one or more electroactive materials selected from the group consisting of: lithium, silicon, silicon oxide, graphite, graphene, carbon nanotubes, lithium titanium oxide (Li4Ti5O12), tin (Sn), vanadium oxide (V2O5), tin oxide (SnO), titanium dioxide (TiO2), titanium niobium oxide (TixNbyOz, where $0 \leq x \leq 2$, $0 \leq y \leq 24$, and $0 \leq z \leq 64$), FeS, and combinations thereof.

In one aspect, the pre-lithiated electrode may include greater than or equal to about 1 wt. % to less than or equal to about 50 wt. % of the lithiation additive and greater than or equal to about 1 wt. % to less than or equal to about 95 wt. % of the one or more electroactive materials.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of" Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present technology relates to improved electrodes (and electrochemical cells including the improved electrodes) and methods of making the same that reduce operation inefficiencies resulting from, for example, loss of active lithium ion during the first cell cycle. In particular, the present disclosure provides methods of pre-lithiating an electroactive material of the electrode. The pre-lithiation creates a lithium reservoir in the cell. The reserved lithium compensates for lithium lost during cycling, including during the first cycle, of the electrochemical cell so as to decrease capacity loss over time.

Figure 1:
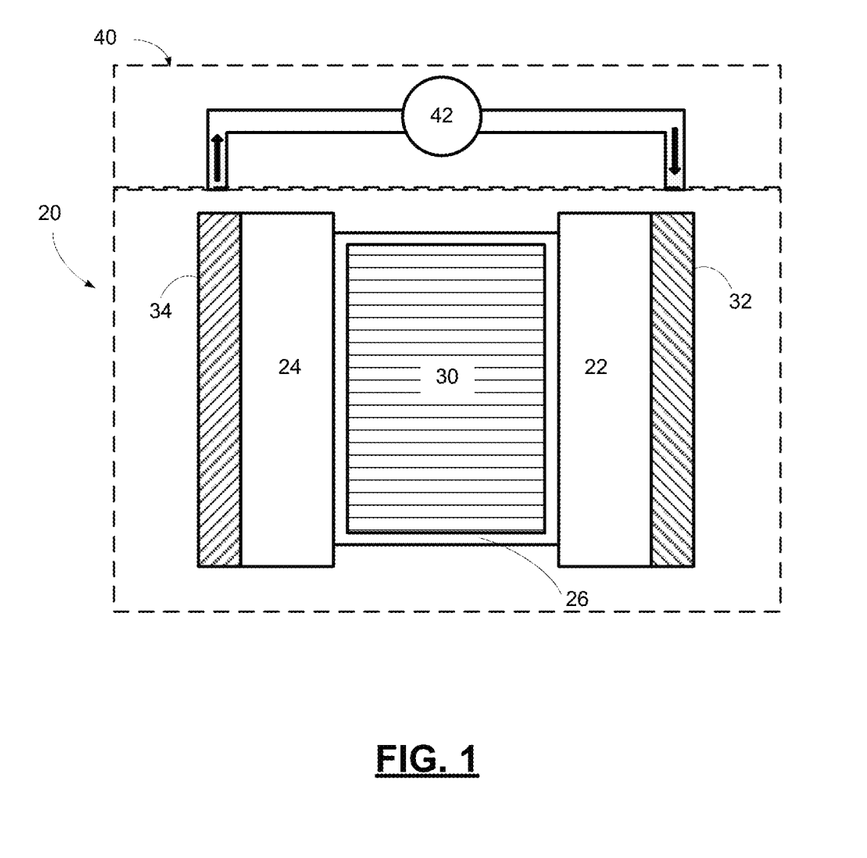
FIG. 1 is an example schematic illustration of an electrochemical cell having a negative electrode in accordance with various aspects of the present disclosure.

An exemplary and schematic illustration of an electrochemical cell (also referred to as the battery) 20 is shown in FIG. 1. The battery 20 includes a negative electrode 22, a positive electrode 24, and a separator 26 disposed between the electrodes 22, 24. In certain variations, the separator 26 may be formed by a solid-state electrolyte. For example, the separator 26 may be defined by a plurality of solid-state electrolyte particles (not shown). The separator 26 provides electrical separation—prevents physical contact—between the electrodes 22, 24. The separator 26 also provides a minimal resistance path for internal passage of lithium ions, and in certain instances, related anions, during cycling of the lithium ions. In certain variations, pluralities of solid-state electrolyte particle (now shown) may also be mixed with electroactive materials present in the negative and positive electrodes 22, 24, respectively.

A negative electrode current collector 32 may be positioned at or near the negative electrode 22, and a positive electrode current collector 34 may be positioned at or near the positive electrode 24. The negative electrode current collector 32 and the positive electrode current collector 34 respectively collect and move free electrons to and from an external circuit 40. For example, an interruptible external circuit 40 and a load device 42 may connect the negative electrode 22 (through the negative electrode current collector 32) and the positive electrode 24 (through the positive electrode current collector 34). The positive current collector 34 may be a metal foil, metal grid or screen, or expanded metal comprising aluminum or any other appropriate electrically conductive material known to those of skill in the art. The negative current collector 32 may be a metal foil, metal grid or screen, or expanded metal comprising copper or any other appropriate electrically conductive material known to those of skill in the art.

The battery 20 can generate an electric current during discharge by way of reversible electrochemical reactions that occur when the external circuit 40 is closed (to connect the negative electrode 22 and the positive electrode 24) and the negative electrode 22 contains a relatively greater quantity of lithium. The chemical potential difference between the positive electrode 24 and the negative electrode 22 drives electrons produced by the oxidation of inserted lithium at the negative electrode 22 through the external circuit 40 towards the positive electrode 24. Lithium ions, which are also produced at the negative electrode 22, are concurrently transferred through the separator 26 towards the positive electrode 24. The electrons flow through the external circuit 40 and the lithium ions migrate across the separator 26 to the positive electrode 24, where they may be plated, reacted, or intercalated. The electric current passing through the external circuit 40 can be harnessed and directed through the load device 42 until the lithium in the negative electrode 22 is depleted and the capacity of the battery 20 is diminished.

The battery 20 can be charged or re-energized at any time by connecting an external power source (e.g., charging device) to the battery 20 to reverse the electrochemical reactions that occur during battery discharge. The connection of the external power source to the battery 20 compels the non-spontaneous oxidation of one or more metal elements at the positive electrode 24 to produce electrons and lithium ions. The electrons, which flow back towards the negative electrode 22 through the external circuit 40, and the lithium ions, which move across the separator 26 back towards the negative electrode 22, reunite at the negative electrode 22 and replenish it with lithium for consumption during the next battery discharge cycle. As such, each discharge and charge event is considered to be a cycle, where lithium ions are cycled between the positive electrode 24 and the negative electrode 22.

The external power source that may be used to charge the battery 20 may vary depending on size, construction, and particular end-use of the battery 20. Some notable and exemplary external power sources include, but are not limited to, AC power sources, such as an AC wall outlet and a motor vehicle alternator. In many battery 20 configurations, each of the negative electrode current collector 32, the negative electrode 22, the separator 26, the positive electrode 24, and the positive electrode current collector 34 are prepared as relatively thin layers (for example, from several microns to a millimeter or less in thickness) and assembled in layers connected in electrical parallel arrangement to provide a suitable electrical energy and power package. In various other instances, the battery 20 may include electrodes 22, 24 that are connected in series.

Further, in certain aspects, the battery 20 may include a variety of other components that, while not depicted here, are nonetheless known to those of skill in the art. For instance, the battery 20 may include a casing, gasket, terminal caps, and any other conventional components or materials that may be situated within the battery 20, including between or around the negative electrode 22, the positive electrode 24, and/or the separator 26, by way of non-limiting example. As noted above, the size and shape of the battery 20 may vary depending on the particular applications for which it is designed. Battery-powered vehicles and hand-held consumer electronic devices are two non-limiting examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42.

Accordingly, the battery 20 can generate electric current to a load device 42 that can be operatively connected to the external circuit 40. The load device 42 may be powered fully or partially by the electric current passing through the external circuit 40 when the lithium ion battery 20 is discharging. While the load device 42 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances, by way of non-limiting example. The load device 42 may also be a power-generating apparatus that charges the battery 20 for purposes of storing energy.

With renewed reference to FIG. 1, the electrodes 22, 24 and/or the separator 26 may each include an electrolyte solution or system 30. Any appropriate electrolyte 30, whether in solid, liquid, or gel form, capable of conducting lithium ions between the electrodes 22, 24, may be used in the battery 20. For example, the electrolyte 30 may be a non-aqueous liquid electrolyte solution that includes a lithium salt dissolved in an organic solvent or a mixture of organic solvents. Numerous conventional non-aqueous liquid electrolyte solutions may be employed in the battery 20.

Appropriate lithium salts generally have inert anions. A non-limiting list of lithium salts that may be dissolved in an organic solvent or a mixture of organic solvents to form the non-aqueous liquid electrolyte solution include lithium hexafluorophosphate (LiPF$_6$); lithium perchlorate (LiClO$_4$), lithium tetrachloroaluminate (LiAlCl$_4$), lithium iodide (LiI), lithium bromide (LiBr), lithium thiocyanate (LiSCN), lithium tetrafluoroborate (LiBF$_4$), lithium difluorooxalatoborate (LiBF$_2$(C$_2$O$_4$)) (LiODFB), lithium tetraphenylborate (LiB(C$_6$H$_5$)$_4$), lithium bis-(oxalate)borate (LiB(C$_2$O$_4$)$_2$) (LiBOB), lithium tetrafluorooxalatophosphate (LiPF$_4$(C$_2$O$_4$)) (LiFOP), lithium nitrate (LiNO$_3$), lithium hexafluoroarsenate (LiAsF$_6$), lithium trifluoromethanesulfonate (LiCF$_3$SO$_3$), lithium bis(trifluoromethanesulfonimide) (LiTFSI) (LiN(CF$_3$SO$_2$)$_2$), lithium fluorosulfonylimide (LiN(FSO$_2$)$_2$) (LiFSI), and combinations thereof. In certain variations, the lithium salt is selected from lithium hexafluorophosphate (LiPF$_6$), lithium bis(trifluoromethanesulfonimide) (LiTFSI) (LiN(CF$_3$SO$_2$)$_2$), lithium fluorosulfonylimide (LiN(FSO$_2$)$_2$) (LiFSI), lithium fluoroalkylphosphate (LiFAP) (Li$_3$O$_4$P), and combinations thereof.

These and other similar lithium salts may be dissolved in a variety of organic solvents, including but not limited to various alkyl carbonates, such as cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethyl methyl carbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane (DME), 1-2-diethoxyethane, ethoxymethoxyethane), cyclic ethers (e.g., tetrahydrofuran, 2-methyltetrahydrofuran), 1,3-dioxolane (DOL)), sulfur compounds (e.g., sulfolane), and combinations thereof. In various aspects, the electrolyte 30 may include greater than or equal to 1M to less than or equal to about 2M concentration of the one or more lithium salts. In certain variations, for example when the electrolyte has a lithium concentration greater than about 2 M or ionic liquids, the electrolyte 30 may include one or more diluters, such as fluoroethylene carbonate (FEC) and/or hydrofluoroether (HFE).

In various aspects, the electrolyte 30 may be a solid-state electrolyte, which forms the separator 26. The solid-state electrolyte may include one or more solid-state electrolyte particles that may comprise one or more polymer-based particles, oxide-based particles, sulfide-based particles, halide-based particles, borate-based particles, nitride-based particles, and hydride-based particles. Such a solid-state electrolyte may be disposed in a plurality of layers so as to define a three-dimensional structure. In various aspects, the polymer-based particles may be intermingled with a lithium salt so as to act as a solid solvent. In certain variations, the polymer-based particles may comprise one or more of polymer materials selected from the group consisting of: polyethylene glycol, poly(p-phenylene oxide) (PPO), poly(methyl methacrylate) (PMMA), polyacrylonitrile (PAN), polyvinylidene fluoride (PVDF), poly(vinylidene fluoride-co-hexafluoropropylene (PVDF-HFP), polyvinyl chloride (PVC), and combinations thereof. In one variation, the one or more polymer materials may have an ionic conductivity equal to about $10^4$ S/cm.

In various aspects, the oxide-based particles may comprise one or more garnet ceramics, LISICON-type oxides, NASICON-type oxides, and Perovskite type ceramics. For example, the one or more garnet ceramics may be selected from the group consisting of: $Li_{6.5}La_3Zr_{1.75}Te_{0.25}O_{12}$, $Li_7La_3Zr_2O_{12}$, $Li_{6.2}Ga_{0.3}La_{2.95}Rb_{0.05}Zr_2O_{12}$, $Li_{6.85}La_{2.9}Ca_{0.1}Zr_{1.75}Nb_{0.25}O_{12}$, $Li_{6.25}Al_{0.25}La_3Zr_2O_{12}$, $Li_{6.75}La_3Zr_{1.75}Nb_{0.25}O_{12}$, $Li_{6.75}La_3Zr_{1.75}Nb_{0.25}O_{12}$, and combinations thereof. The one or more LISICON-type oxides may be selected from the group consisting of: $Li_{14}Zn(GeO_4)_4$, $Li_{3+x}(P_{1-x}Si_x)O_4$ (where $0 \le x \le 1$), $Li_{3+x}Ge_xV_{1-x}O_4$ (where $0 \le x \le 1$), and combinations thereof. The one or more NASICON-type oxides may be defined by $LiMM'(PO_4)_3$, where M and M' are independently selected from Al, Ge, Ti, Sn, Hf, Zr, and La. For example, in certain variations, the one or more NASICON-type oxides may be selected from the group consisting of: $Li_{1+x}Al_xGe_{2-x}(PO_4)_3$ (LAGP) (where $0 \le x \le 2$), $Li_{1+x}Al_xTi_{2-x}(PO_4)_3$ (LATP) (where $0 \le x \le 2$), $Li_{1-x}Y_xZr_{2-x}(PO_4)_3$ (LYZP) (where $0 \le x \le 2$), $Li_{1.3}Al_{0.3}Ti_{1.7}(PO_4)_3$, $LiTi_2(PO_4)_3$, $LiGeTi(PO_4)_3$, $LiGe_2(PO_4)_3$, $LiHf_2(PO_4)_3$, and combinations thereof. The one or more Perovskite-type ceramics may be selected from the group consisting of: $Li_{3.3}La_{0.53}TiO_3$, $LiSr_{1.65}Zr_{1.3}Ta_{1.7}O_9$, $Li_{2x-y}Sr_{1-x}Ta_yZr_{1-y}O_3$ (where x=0.75y and $0.60 \le y \le 0.75$), $Li_{3/8}Sr_{7/16}M_{3/4}Zr_{1/4}O_3$, $Li_{3x}La_{(2/3-x)}TiO_3$ (where $0 \le x \le 0.25$), and combinations thereof. In one variation, the one or more oxide-based materials may have an ionic conductivity greater than or equal to about $10^{-5}$ S/cm to less than or equal to about $10^{-3}$ S/cm.

In various aspects, the sulfide-based particles may include one or more sulfide-based materials selected from the group consisting of: $Li_2S$—$P_2S_5$, $Li_2S$—$P_2S_5$-$MS_x$ (where M is Si, Ge, and Sn and $0 \le x \le 2$), $Li_{3.4}Si_{0.4}P_{0.6}S_4$, $Li_{10}GeP_2S_{11.7}O_{0.3}$, $Li_{9.6}P_3S_{12}$, $Li_7P_3S_{11}$, $Li_9P_3S_9O_3$, $Li_{10.35}Si_{1.35}P_{1.6}S_{512}$, $Li_{9.81}Sn_{0.81}P_{2.19}S_{12}$, $Li_{10}(S_{10.5}Ge_{0.5})P_2S_{12}$, $Li(Ge_{0.5}Sn_{0.5})P_2S_{12}$, $Li(S_{10.5}Sn_{0.5})P_5S_{12}$, $Li_{10}GeP_2S_{12}$ (LGPS), $Li_6PS_5X$ (where X is Cl, Br, or I), $Li_7P_2S_8I$, $Li_{10.35}Ge_{1.35}P_{1.65}S_{12}$, $Li_{3.25}Ge_{0.25}P_{0.75}S_4$, $Li_{10}SnP_2S_{12}$, $Li_{10}SiP_2S_{12}$, $Li_{9.54}Si_{1.74}P_{1.44}S_{11.7}Cl_{0.3}$, $(1-X)P_2S_{5-x}Li_2S$ (where $0.5 \le x \le 0.7$), and combinations thereof. In one variation, the one or more sulfide-based materials may have an ionic conductivity greater than or equal to about $10^{-7}$/cm to less than or equal to about $10_{-2}$ S/cm.

In various aspects, the halide-based particles may include one or more halide-based materials selected from the group consisting of: $Li_2CdCl_4$, $Li_2MgCl_4$, $Li_2CdI_4$, $Li_2ZnI_4$, $Li_3OCl$, LiI, $Li_5ZnI_4$, $Li_3OCl_{1-x}Br_x$ (where $0 \le x \le 1$), and combinations thereof. In one variation, the one or more halide-based materials may have an ionic conductivity greater than or equal to about $10^{-8}$ S/cm to less than or equal to about $10^{-5}$ S/cm.

In various aspects, the borate-based particles may include one or more borate-based materials selected from the group consisting of: $Li_2B_4O_7$, $Li_2O$—$(B_2O_3)$—$(P_2O_5)$, and combinations thereof. In one variation, the one or more borate-based materials may have an ionic conductivity greater than or equal to about $10^{-7}$ S/cm to less than or equal to about $10^{-6}$ S/cm.

In various aspects, the nitride-based particles may include one or more nitride-based materials selected from the group consisting of: $Li_3N$, $Li_7PN_4$, $LiSi_2N_3$, LiPON, and combinations thereof. In one variation, the one or more nitride-based materials may have an ionic conductivity greater than or equal to about $10^{-9}$ S/cm to less than or equal to about $10^{-3}$ S/cm.

In various aspects, the hydride-based particles may include one or more hydride-based materials selected from the group consisting of: $Li_3AlH_6$, $LiBH_4$, $LiBH_4$—LiX (where X is one of Cl, Br, and I), $LiNH_2$, $Li_2NH$, $LiBH_4$—$LiNH_2$, and combinations thereof. In one variation, the one or more hydride-based materials may have an ionic conductivity greater than or equal to about $10^{-7}$ S/cm to less than or equal to about $10^{-4}$ S/cm.

In still further variations, the electrolyte 30 may be a quasi-solid electrolyte comprising a hybrid of the above detailed non-aqueous liquid electrolyte solution and solid-state electrolyte systems—for example including one or more ionic liquids and one or more metal oxide particles, such as aluminum oxide ($Al_2O_3$) and/or silicon dioxide ($SiO_2$).

In various instances, the separator 26 may be a microporous polymeric separator including a polyolefin, including those made from a homopolymer (derived from a single monomer constituent) or a heteropolymer (derived from more than one monomer constituent)), which may be either linear or branched. In certain aspects, the polyolefin may be polyethylene (PE), polypropylene (PP), or a blend of PE and PP, or multi-layered structured porous films of PE and/or PP. Commercially available polyolefin porous separator 26 membranes include CELGARD® 2500 (a monolayer polypropylene separator) and CELGARD® 2340 (a trilayer polypropylene/polyethylene/polypropylene separator) available from Celgard LLC.

When the separator 26 is a microporous polymeric separator, it may be a single layer or a multi-layer laminate. For example, in one embodiment, a single layer of the polyolefin may form the entire microporous polymer separator 26. In other aspects, the separator 26 may be a fibrous membrane having an abundance of pores extending between the opposing surfaces and may have a thickness of less than a millimeter, for example. As another example, however, multiple discrete layers of similar or dissimilar polyolefins may be assembled to form the separator 26.

The microporous polymer separator 26 may also include other polymers alternatively or in addition to the polyolefin, such as, but not limited to, polyethylene terephthalate (PET), polyvinylidene fluoride (PVdF), polyamide (nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polymethylpentene, polyolefin copolymers, acrylonitrile-butadiene styrene copolymers (ABS), polystyrene copolymers, polymethylmethacrylate (PMMA), polysiloxane polymers (e.g., polydimethylsiloxane (PDMS)), polybenzimidazole (PBI), polybenzoxazole (PBO), polyphenylenes, polyarylene ether ketones, polyperfluorocyclobutanes, polyvinylidene fluoride copolymers (e.g., PVdF—hexafluoropropylene or (PVdF-HFP)), and polyvinylidene fluoride terpolymers, polyvinylfluoride, liquid crystalline polymers (e.g., VECTRAN' (Hoechst AG, Germany) and ZENITE® (DuPont, Wilmington, Del.)), polyaramides, polyphenylene oxide, cellulosic materials, mesoporous silica, or a combination thereof.

Furthermore, the separator 26 may be mixed with a ceramic material or its surface may be coated in a ceramic material. For example, a ceramic coating may include alumina ($Al_2O_3$), silicon dioxide ($SiO_2$), or combinations thereof. Various conventionally available polymers and commercial products for forming the separator 26 are contemplated, as well as the many manufacturing methods that may be employed to produce such a microporous polymer separator 26.

The positive electrode 24 comprises a lithium-based positive electroactive material that is capable of undergoing lithium intercalation and deintercalation, alloying and dealloying, or plating and stripping, while functioning as a positive terminal of the capacitor battery 20. In various aspects, the positive electrode 24 may be defined by a plurality of electroactive material particles (not shown). Such positive electroactive material particles may be disposed in one or more layers so as to define the three-dimensional structure of the positive electrode 24. In certain variations, as noted above, the positive electrode 24 may further include the electrolyte 30, for example a plurality of electrolyte particles (not shown).

The positive electrode 24 may be one of a layered-oxide cathode, a spinel cathode, and a polyanion cathode. For example, layered-oxide cathodes (e.g., rock salt layered oxides) comprise one or more lithium-based positive electroactive materials selected from $LiNi_xMn_yCo_{1-x-y}O_2$ (where $0 \le x \le 1$ and $0 \le y \le 1$), $LiNi_xMn_{1-x}O_2$ (where $0 \le x \le 1$), $Li_{1+x}MO_2$ (where M is one of Mn, Ni, Co, and Al and $0 \le x \le 1$) (for example $LiCoO_2$ (LCO), $LiNiO_2$, $LiMnO_2$, $LiNi_{0.5}Mn_{0.5}O_2$, NMC111, NMC523, NMC622, NMC 721, NMC811, NCA). Spinel cathodes comprise one or more lithium-based positive electroactive materials selected from $LiMn_2O_4$ (LMO) and $LiNi_{0.5}Mn_{1.5}O_4$. Olivine type cathodes comprise one or more lithium-based positive electroactive material such as $LiV_2(PO_4)_3$, $LiFePO_4$, $LiCoPO_4$, and $LiMnPO_4$. Tavorite type cathodes comprise, for example, $LiVPO_4F$. Borate type cathodes comprise, for example, one or more of $LiFeBO_3$, $LiCoBO_3$, and $LiMnBO_3$. Silicate type cathodes comprise, for example, $Li_2FeSiO_4$, $Li_2MnSiO_4$, and $LiMnSiO_4F$. In still further variations, the positive electrode 24 may comprise one or more other positive electroactive materials, such as one or more of dilithium (2,5-dilithiooxy)terephthalate and polyimide. In various aspects, the positive electroactive material may be optionally coated (for example by $LiNbO_3$ and/or $Al_2O_3$) and/or may be doped (for example by one or more of magnesium (Mg), aluminum (Al), and manganese (Mn)).

In various aspects, the positive electroactive material in the positive electrode 24 may be optionally intermingled with one or more electrically conductive materials that provide an electron conductive path and/or at least one polymeric binder material that improves the structural integrity of the positive electrode 24. For example, the positive electroactive material in the positive electrode 24 may be optionally intermingled with binders such as poly(tetrafluoroethylene) (PTFE), sodium carboxymethyl cellulose (CMC), styrene-butadiene rubber (SBR), poly(vinylidene fluoride) (PVDF), nitrile butadiene rubber (NBR), styrene ethylene butylene styrene copolymer (SEBS), styrene butadiene styrene copolymer (SBS), lithium polyacrylate (LiPAA), sodium polyacrylate (NaPAA), sodium alginate, lithium alginate, and combinations thereof. Electrically conductive materials may include carbon-based materials, powder nickel or other metal particles, or a conductive polymer. Carbon-based materials may include, for example, particles of carbon black, graphite, acetylene black (such as KETCHEN™ black or DENKA™ black), carbon fibers and nanotubes, graphene, and the like. Examples of a conductive polymer include polyaniline, polythiophene, polyacetylene, polypyrrole, and the like. The positive electrode 24 may include greater than or equal to about 50 wt. % to less than or equal to about 99 wt. %, and in certain aspects, optionally greater than or equal to about 50 wt. % to less than or equal to about 95 wt. %, of the positive electroactive material, optionally greater than or equal to about 0 wt. % to less than or equal to about 30 wt. % of electrically conductive materials, and optionally greater than or equal to about 0 wt. % to less than or equal to about 20 wt. % of a binder.

In certain aspects, the negative electrode 22 is formed from a lithium host material that is capable of functioning as a negative terminal of a lithium ion battery. For example, the negative electrode 22 may comprise a lithium host material (e.g., negative electroactive material) that is capable of functioning as a negative terminal of the battery 20. In various aspects, the negative electrode 22 may be defined by a plurality of negative electroactive material particles (not shown). Such negative electroactive material particles may be disposed in one or more layers so as to define the three-dimensional structure of the negative electrode 22. In certain variations, as noted above, the negative electrode 22 may further include the electrolyte 30, for example a plurality of electrolyte particles (not shown).

The negative electrode 22 may be a negative electroactive material that is lithium based comprising, for example, a lithium metal and/or lithium alloy. In other variations, the negative electrode 22 may be a negative electroactive material that is silicon based comprising silicon, for example, a silicon alloy, silicon oxide, or combinations thereof that may be further mixed, in certain instances, with graphite. In still other variations, the negative electrode 22 may be a negative electroactive material that is a carbonaceous anode comprising one or more negative electroactive materials such as graphite, graphene, and/or carbon nanotubes (CNTs). In still further variations, the negative electrode 22 may comprise one or more lithium-accepting negative electroactive materials such as lithium titanium oxide ($Li_4Ti_5O_{12}$), one or more transition metals (such as tin (Sn)), one or more metal oxides (such as vanadium oxide ($V_2O_5$), tin oxide (SnO), titanium dioxide ($TiO_2$)), titanium niobium oxide ($Ti_xNb_yO_z$, where $0 \le x \le 2$, $0 \le y \le 24$, and $0 \le z \le 64$), and one or more metal sulfides (such as ferrous or iron sulfide (FeS)).

In various aspects, the negative electroactive material in the negative electrode 22 may be optionally intermingled with one or more electrically conductive materials that provide an electron conductive path and/or at least one polymeric binder material that improves the structural integrity of the negative electrode 22. For example, the negative electroactive material in the negative electrode 22 may be optionally intermingled with binders such as poly(tetrafluoroethylene) (PTFE), sodium carboxymethyl cellulose (CMC), styrene-butadiene rubber (SBR), poly(vinylidene fluoride) (PVDF), nitrile butadiene rubber (NBR), styrene ethylene butylene styrene copolymer (SEBS), styrene butadiene styrene copolymer (SBS), lithium polyacrylate (LiPAA), sodium polyacrylate (NaPAA), sodium alginate, lithium alginate, and combinations thereof. Electrically conductive materials may include carbon-based materials, powder nickel or other metal particles, or a conductive polymer. Carbon-based materials may include, for example, particles of carbon black, graphite, acetylene black (such as KETCHEN™ black or DENKA™ black), carbon fibers and nanotubes, graphene, and the like. Examples of a conductive polymer include polyaniline, polythiophene, polyacetylene, polypyrrole, and the like. The negative electrode 22 may include greater than or equal to about 50 wt. % to less than or equal to about 99 wt. %, and in certain aspects, optionally greater than or equal to about 50 wt. % to less than or equal to about 95 wt. %, of the negative electroactive material (e.g., lithium particles or a lithium foil), optionally greater than or equal to about 0 wt. % to less than or equal to about 30 wt. % of electrically conductive materials, and optionally greater than or equal to about 0 wt. % to less than or equal to about 20 wt. % of a binder.

In certain instances, for example when substantially all of the lithium returns to the positive electrode after the first cycling, the battery charge reaction may be represented by $(Li-H_{pos})+H_{neg} \rightleftharpoons (Li-H_{neg})+H_{pos}$, where H represents the vacant sites that can accept lithium and x is approximately 1 (e.g., initial capacity). In such instances, reactions in the positive electrode may be represented by $(Li-H_{pos}) \rightarrow Li^+ + e^- + H_{pos}$ and reactions in the negative electrode may be represented by $Li^+ + e^- + H_{neg} \rightarrow (Li-H_{neg})$. In many instances, however, as discussed above, in particular during the first charge cycle, some lithium may be consumed by the negative electrode. In such instances, the charge reaction after the first cycle may be represented by:

$(Li-H_{pos})+H_{neg}+Solvent \rightarrow (Li_x-H_{neg})+ (Li_{1-x}-Solvent) \downarrow +H_{pos}$. In this instance, $(Li_{1-x}-Solvent) \downarrow$, represents unrecoverable lithium, for example as a result of precipitation ($\downarrow$). The adduct is insoluble and inactive resulting generally in an irreversible capacity loss of greater than or equal to about 5% to less than or equal to about 30% after the first cycle. In such instances, reactions in the positive electrode may be represented by:

$(Li-H_{pos}) \rightarrow Li^+ + e^- + H_{pos}$ and reactions in the negative electrode may be represented by:

$xLi^+ + xe^- + H_{neg} \rightarrow (Li-H_{neg})$  1); and $(1-x)Li^+ + (1-x)e^- + Solvent \rightarrow (Li_{1-x}-Solvent) \downarrow$,  2)

where x is the first cycle efficiency. In various aspects, the first cycle efficiency (x) may be greater than or equal to about 0.5 to less than or equal to about 1, optionally greater than or equal to about 0.5 to less than or equal to about 0.95, and in certain aspects, greater than or equal to about 0.7 to less than or equal to about 0.95. Such cycle inefficiencies may be a result of unrecoverable lithium, and in certain aspects, lost solvent.

In accordance with various aspects of the present disclosure, the negative electrode 22 may further includes a lithiation additive, for example, a lithium silicate or silica generally represented by $Li_uH_r$, where $H_r=Li_{y-u}SiO_z$ and where $0 \leq y \leq 3.75$ and $0 \leq z \leq 2$ and u is a useable portion of y, $0 \leq u \leq y$. In such instances, $$\frac{z}{4}Li_4SiO_4 \text{ and/or}$$

$Li_mSi$ (where m is an amount of pre-lithiation lithium, in various aspects m may be greater than or equal to about 0 to less than or equal to about 4.4 (i.e., $0 \leq m \leq 4.4$), and in certain aspects optionally greater than or equal to about 0 to less than or equal to about 3.75 (i.e., $0 \leq m \leq 3.75$)) may serve as lithium sources that compensate for lithium ion loss during cell cycling, in particular during the first cycle, so as to decrease battery cost and maximize specific power and energy. For example, the cell charge reaction may be represented by:

$wLi_uH_r+(Li_x-H_{neg})+H_{pos} \rightleftharpoons (w \cdot u+x)(Li-H_{pos})+wH_r+H_{neg}$.

To fully utilize the positive electrode, ideally $w \cdot u+x=1$, such that $w \cdot u=1-x$ and $$w = \frac{1-x}{u}.$$

The value w represents the amount of the lithiation additive, for example lithiated silica represented by the formula $Li_uH_r$, that should be added to the negative electrode 22 to compensate for cycle inefficiencies, for example lithium consumption occurring during a first cycle, if capacities of the negative and positive electrodes 22, 24 are matched. In sum, in such instances, the cell charge reaction may be represented by:

$$\frac{1-x}{u}Li_uH_r + (Li_x - H_{neg}) + H_{pos} \rightarrow (Li - H_{pos}) + \frac{1-x}{u}H_r + H_{neg}.$$

In various aspects, the negative electrode 22 may include greater than or equal to about 1 wt. % to less than or equal to about 50 wt. %, and in certain aspects, optionally greater than or equal to about 10 wt. % to less than or equal to about 50 wt. %, of the lithiation additive, such that the battery 20 experiences a total capacity loss of less than or equal to about 5% of capacity as compared to an initial capacity prior to initial cycling of lithium. In certain aspects, the negative electrode 22 may be over-lithiated, for example when the negative electrode 22 is a silicon-based electrode, to further compensate from lithium loss during both the first cycle and subsequent cycles. For example, in such instances, the negative electrode 22 may include greater than or equal to about 20 wt. % to less than or equal to about 80 wt. %, and in certain aspects, optionally greater than or equal to about 30 wt. % to less than or equal to about 50 wt. %, of the lithiation additive.

In accordance with various aspects of the present disclosure, methods for pre-lithiating an electrode, for example the negative electrode 22 illustrated in FIG. 1, are provided. Such methods for pre-lithiating an electroactive material to form a pre-lithiated electrode for an electrochemical cell may include adding a lithiation additive comprising, for example, a lithium silicate or silica generally represented by $Li_uH_r$ where $H_r=Li_{y-u}SiO_z$ and where $0 \leq y \leq 3.75$ and $0 \leq z \leq 2$ and u is a useable portion of y, 0≤u≤y, to an electroactive material in an environment comprising oxygen and that is substantially free of water (e.g., a dry-air environment). Such environments may have dew points of greater than or equal to about −100° C. to less than or equal to about 0° C., for example relative humidity of about 0.5% at about 22° C. In various aspects, particulates of the lithiation additive may be added to a slurry that is subsequently used to form the electrode, in a dry-air environment.

Figure 2A:
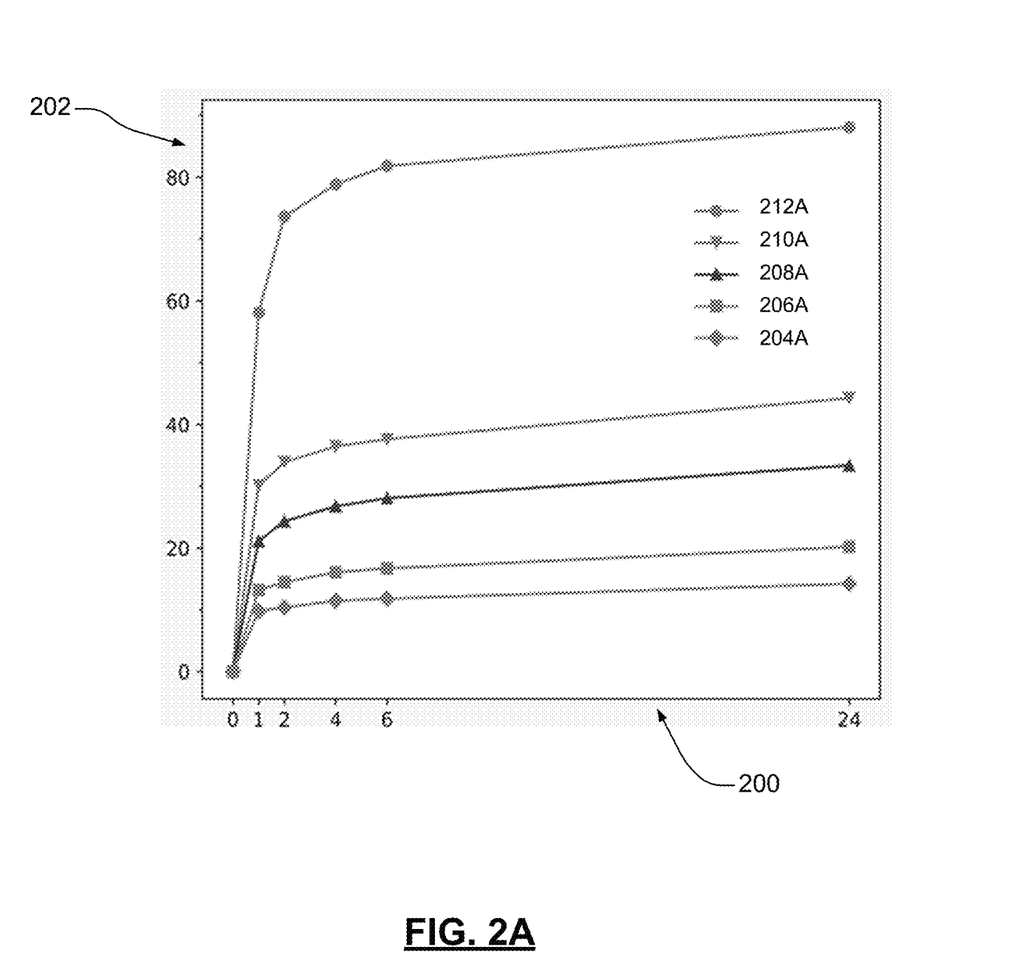
FIG. 2A illustrates mass changes (over time) of comparative composite electrodes including lithiated additives in air.

In various aspects, the lithiation additive may have poor stability in regular air. For example, in certain aspects, such instability may result from reaction of the lithiated silica with environmental moisture and/or carbon dioxide ($CO_2$) forging undesirable mass increases. FIG. 2A illustrates the mass change of comparative $SiO_x$|Li coin cells having lithiation additives with differing lithiated conditions. For example, comparative cell 212A may include a fully lithiated electrode having a state of charge (SOC) of about 100%, while the remaining comparative cells 204A, 206A, 208A, 210A may have varying lithiation amounts. For example, comparative cell 210A may include an electrode having a state of charge of about 50%, comparative cell 208A may include an electrode having a state of charge of about 40%, comparative cell 206A may include an electrode having a state of charge of about 30%, and comparative cell 204A may include an electrode having a state of charge of about 20%.

Each of the comparative electrodes 204A, 206A, 208A, 210A, 212A may comprise about 90 wt. % of a silicon-based electroactive material (for example $SiO_x$), about 5 wt. % of an electrically conductive material (for example carbon black), and about 5 wt. % of a binder (for example carboxymethyl cellulose (CMC)). The comparative cells may include about 50 μL of an electrolyte and a porous separator (for example CELGARD® 2340). The electrolyte may include 1M lithium hexafluorophosphate ($LiPF_6$) and co-solvents (1:2) ethylene carbonate (EC) and diethyl carbonate (DEC). The electrolyte may further include about 10 wt. % of fluoroethylene carbonate (FEC).

In various aspects, the comparative electrodes may each be prepared by uniformly mixing (for example using a planetary mixer) the silicon-based electroactive material and the lithiation additive and optionally an electrically conductive material and/or binder. The homogenous slurry may be cast onto a current collector (for example a copper foil) and dried to form the electrode. In such instances, the comparative electrodes may have a thickness of about 65 μm and the comparative electrodes may have a loading of about 5.96 mg $cm^{-2}$ of the silicon-based electroactive material.

In various aspects other aspects, the lithiation additive may be mixed with an electrically conductive material and/or binder and cast onto the current collector to form a first lithiation layer and the electroactive material may be casted onto an exposed surface of the lithiation layer to form an electroactive material layer. In such instances, the lithiation layer may have a thickness of greater than or equal to about 10 nm to less than or equal to about 20 μm, and in certain aspects, optionally greater than or equal to about 10 nm to less than or equal to about 10 μm; and the electroactive material layer may have a thickness of greater than or equal to about 500 nm to less than or equal to about 200 nm, and in certain aspects, optionally greater than or equal to about 100 nm to less than or equal to about 200 nm.

In various aspects other aspects, the lithiation additive may be mixed with an electrically conductive material and/or binder and cast onto the current collector to form a first lithiation layer and the electroactive material may be casted onto an exposed surface of the lithiation layer to form an electroactive material layer. In such instances, the lithiation layer may have a thickness of greater than or equal to about 10 nm to less than or equal to about 20 μm, and in certain aspects, optionally greater than or equal to about 10 nm to less than or equal to about 10 μm; and the electroactive material layer may have a thickness of greater than or equal to about 200 nm to less than or equal to about 200 μm, and in certain aspects, optionally greater than or equal to about 100 nm to less than or equal to about 200 μm.

Figure 2B:
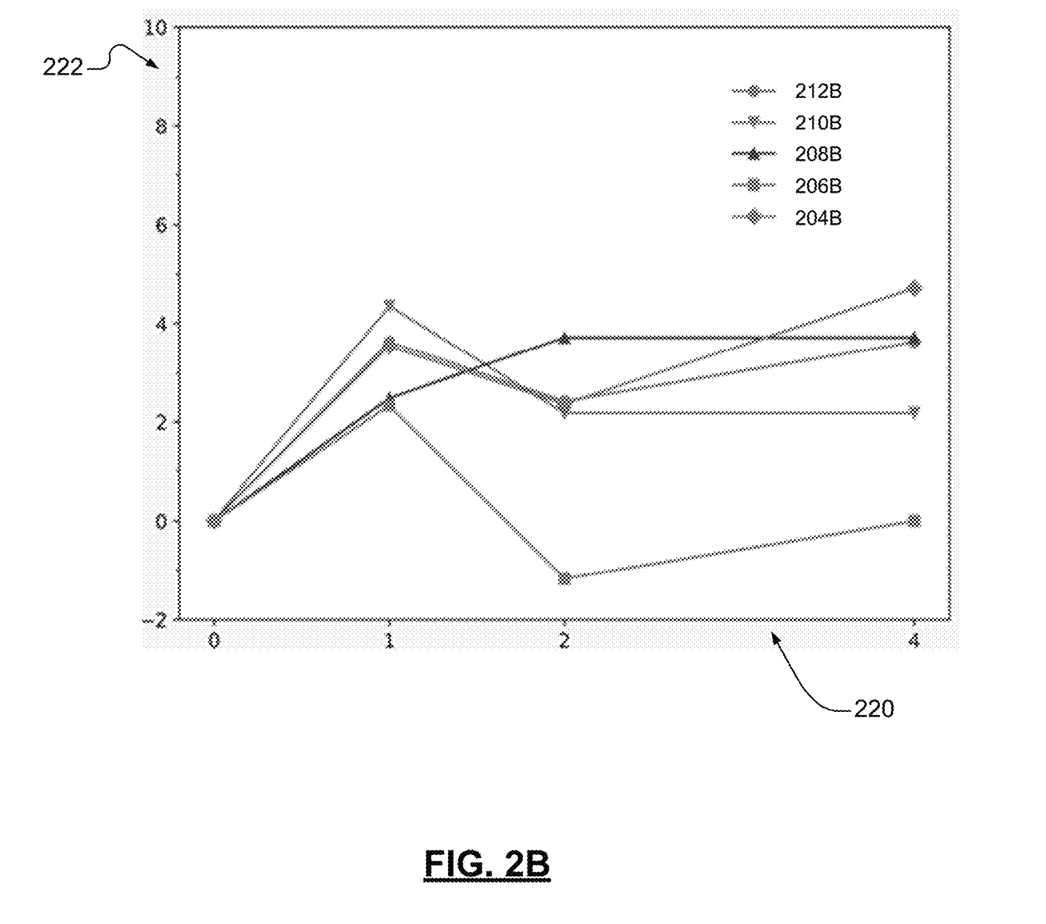
FIG. 2B illustrates mass changes (over time) of comparative composite electrodes including lithiated additives in an environment comprising oxygen and substantially free of water.

FIG. 2B charts the mass changes of cells prepared in an environment comprising oxygen and substantially free of water (e.g., dry air), for example, having a dew point of greater than or equal to about −100° C. to less than or equal to about 0° C., for example a relative humidity of about 0.5% at about 22° C. Comparative cells 204B, 206B, 208B, 210B, 212B correspond with comparative cells 204A, 206A, 208A, 210A, and 212A, respectively. The x-axis 220 in FIG. 2B represents time period in hours of air exposure in the dry room (e.g., a room comprising oxygen and substantially free of water), and the y-axis 222 represents percent increases in mass. As illustrated, minimal mass changes are evident in the comparative cells 204B, 206B, 208B, 210B, 212, which suggests such cells prepared in the environment comprising oxygen and substantially free of water may have improved stability and safety. For example, weight gain resulting from undesirable side reactions with oxygen may be decreased by at least one order of magnitude.

Figure 3:
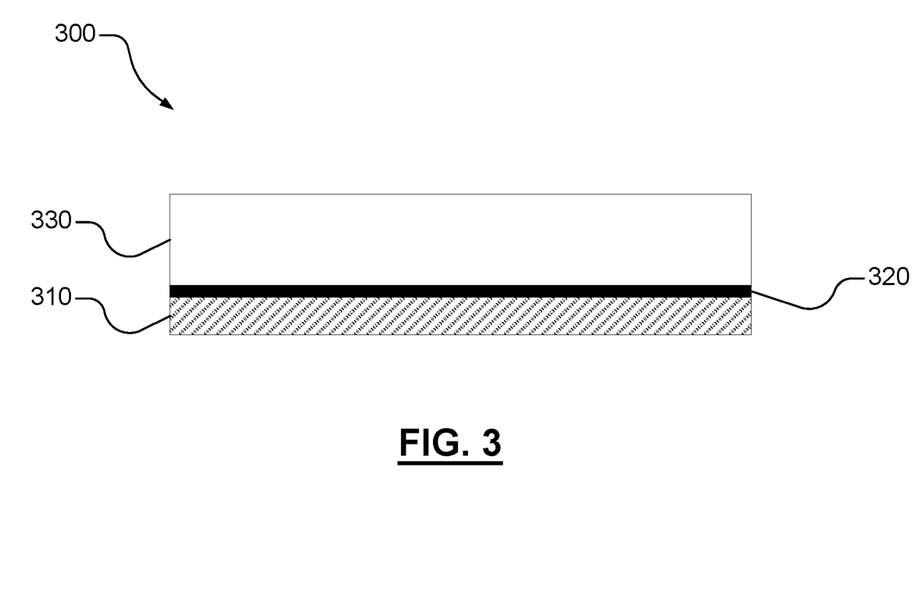
FIG. 3 is an example schematic illustration of a negative electrode having a lithiation layer in accordance with various aspects of the present disclosure.

In accordance with various aspects of the present disclosure, the lithiation additive may form a lithiation layer within a negative electrode, for example, as illustrated in FIG. 3. The negative electrode 300 illustrated in FIG. 3 includes a current collector 310, an electroactive material layer 330, and a lithiation layer 320 disposed therebetween. The lithiation layer 320 may be disposed on or near the current collector 310. For example, the lithiation layer 320 may be disposed using a slurry casting process. In various instances, the lithiation layer 320 may serve as a stress buffer layer. For example, the lithiation layer 320 may serve as a lithium reservoir that compensates for the loss of lithium ions during cell cycling, in particular during the first cycle, so as to decrease battery cost and maximize specific power and energy. The lithiation layer 320 may include a lithiation additive, for example, a lithium silicate or silica generally represented by $Li_uH_r$, where $H_r = Li_{y-u}SiO_z$ and where 0≤y≤3.75 and 0≤z≤2 and u is a useable portion of y, 0≤u≤y. In such instances, $$\frac{z}{4}Li_4SiO_4$$

and/or $Li_mSi$ (where m is an amount of pre-lithiation lithium, in various aspects m may be greater than or equal to about 0 to less than or equal to about 4.4 (i.e., 0≤m≤4.4), and in certain aspects optionally greater than or equal to about 0 to less than or equal to about 3.75 (i.e., 0≤m≤3.75)) may serve as lithium sources that compensates for the loss of lithium ions during cell cycling. The lithiation layer 320 may have a thickness of greater than or equal to about 10 nm to less than or equal to about 20 μm, and in certain aspects, optionally greater than or equal to about 10 nm to less than or equal to about 10 μm.

The current collector 310, similar to current collector 32, may be a metal foil, metal grid or screen, or expanded metal comprising copper or any other appropriate electrically conductive material known to those of skill in the art. The electroactive material layer 330 may be defined by a plurality of negative electroactive material particles (not shown). Such negative electroactive material particles may be disposed in one or more layers so as to define the three-dimensional structure of the electroactive material layer 330. In various aspects, the electroactive material layer 330 may comprise one or more negative electroactive materials selected from the group consisting of: lithium, silicon, silicon oxide, graphite, graphene, carbon nanotubes, lithium titanium oxide ($Li_4Ti_5O_{12}$), tin (Sn), vanadium oxide ($V_2O_5$), tin oxide (SnO), titanium dioxide ($TiO_2$), titanium niobium oxide ($Ti_xNb_yO_z$, where 0≤x≤2, 0≤y≤24, and 0≤z≤64), FeS, and combinations thereof. In certain aspects, the electroactive material layer 330, similar to negative electrode 22, may be optionally intermingled with one or more electrically conductive materials that provide an electron conductive path and/or at least one polymeric binder material that improves the structural integrity of the electroactive material layer 330.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of forming at least one electrode for an electrochemical cell to compensate for capacity loss resulting from cycle-induced lithium consumption, the method comprising:

combining a lithiation additive with an electroactive material to form the at least one electrode to create a lithium source capable of compensating for cycle-induced lithiation loss that occurs when lithium is cycled in the electrochemical cell such that the electrochemical cell experiences a total capacity loss of less than or equal to about 5% of an initial capacity prior to cycling of lithium in the electrochemical cell, wherein the lithiation additive comprises a lithium silicate represented by the formula $Li_uH_r$, wherein $H_r=Li_{y-u}SiO_z$ and wherein 0≤y≤3.75 and 0<z≤2 and u is a useable portion of y, 0≤u≤y.

2. The method of claim 1, wherein the lithium source comprises and $Li_mSi$, where 0≤m≤4.4.

3. The method of claim 1, wherein the at least one electrode includes greater than or equal to about 1 wt. % to less than or equal to about 50 wt. % of the lithiation additive.

4. The method of claim 1, wherein the method includes combining the lithiation additive with the electroactive material and a current collector in an environment comprising oxygen that is substantially free of water and has a dew point of greater than or equal to about −100° C. to less than or equal to about 0° C.

5. The method of claim 4, wherein the combining includes mixing greater than or equal to about 1 wt. % to less than or equal to about 50 wt. % of the lithiation additive with greater than or equal to about 50 wt. % to less than or equal to about 95 wt. % of electroactive material and disposing the mixture on a first surface of the current collector.

6. The method of claim 4, wherein the combining includes forming a lithiation layer comprising the lithiation additive adjacent to the current collector and forming an electroactive layer on one or more exposed surfaces of the lithiation layer.

7. The method of claim 6, wherein the lithiation layer has a thickness greater than or equal to about 10 nm to less than or equal to about 10 μm; and the electroactive layer has a thickness greater than or equal to about 500 nm to less than or equal to about 200 μm.

8. The method of claim 4, wherein the electroactive material is selected from the group consisting of: lithium, silicon, silicon oxide, graphite, graphene, carbon nanotubes, lithium titanium oxide ($Li_4Ti_5O_{12}$), tin (Sn), vanadium oxide ($V_2O_5$), tin oxide (SnO), titanium dioxide ($TiO_2$), titanium niobium oxide ($Ti_xNb_yO_z$, where 0≤x≤2, 0≤y≤24, and 0≤z≤64), iron sulfide (FeS), and combinations thereof.

9. The method of claim 1, wherein the method further includes cycling lithium in the electrochemical cell.

10. A method of forming at least one electrode for an electrochemical cell to compensate for capacity loss resulting from cycle-induced lithium consumption, the method comprising:

combining a lithiation additive with an electroactive material to form a mixture; and casting the mixture on a current collector in an environment comprising oxygen that is substantially free of water and has a dew point of greater than or equal to about −100° C. to less than −50° C. to form the at least one electrode of the electrochemical cell; and incorporating the at least one electrode into the electrochemical cell, wherein the lithiation additive is a lithium source that compensates for cycle-induced lithiation loss that occurs when lithium is cycled in the electrochemical cell such that the electrochemical cell experiences a total capacity loss of less than or equal to about 5% of an initial capacity prior to cycling of lithium in the electrochemical cell, wherein the lithiation additive comprises a lithium silicate represented by the formula $Li_uH_r$, wherein $H_r=Li_{y-u}SiO_z$ and wherein 0≤y≤3.75 and 0≤z≤2 and u is a useable portion of y, 0≤u≤y.

11. The method of claim 10, wherein the combining includes mixing greater than or equal to about 1 wt. % to less than or equal to about 50 wt. % of the lithiation additive with greater than or equal to about 50 wt. % to less than or equal to about 95 wt. % of electroactive material and disposing the mixture on a first surface of the current collector.

12. The method of claim 10, wherein the lithiation layer has a thickness greater than or equal to about 10 nm to less than or equal to about 10 μm; and the electroactive layer has a thickness greater than or equal to about 500 nm to less than or equal to about 200 μm.

13. The method of claim 10, wherein the electroactive material is selected from the group consisting of: lithium, silicon, silicon oxide, graphite, graphene, carbon nanotubes, lithium titanium oxide ($Li_4Ti_5O_{12}$), tin (Sn), vanadium oxide ($V_2O_5$), tin oxide (SnO), titanium dioxide ($TiO_2$), titanium niobium oxide ($Ti_xNb_yO_z$, where 0≤x≤2, 0≤y≤24, and 0≤z≤64), iron sulfide (FeS), and combinations thereof.

14. The method of claim 10, wherein the combining further includes combining an electrically conductive material and a binder with the lithiation additive and the electroactive material to form the mixture.

\* \* \* \* \*